No. 850,854. PATENTED APR. 16, 1907.
C. M. SPENCER.
CLUTCH.
APPLICATION FILED MAR. 8, 1906.
2 SHEETS—SHEET 1.
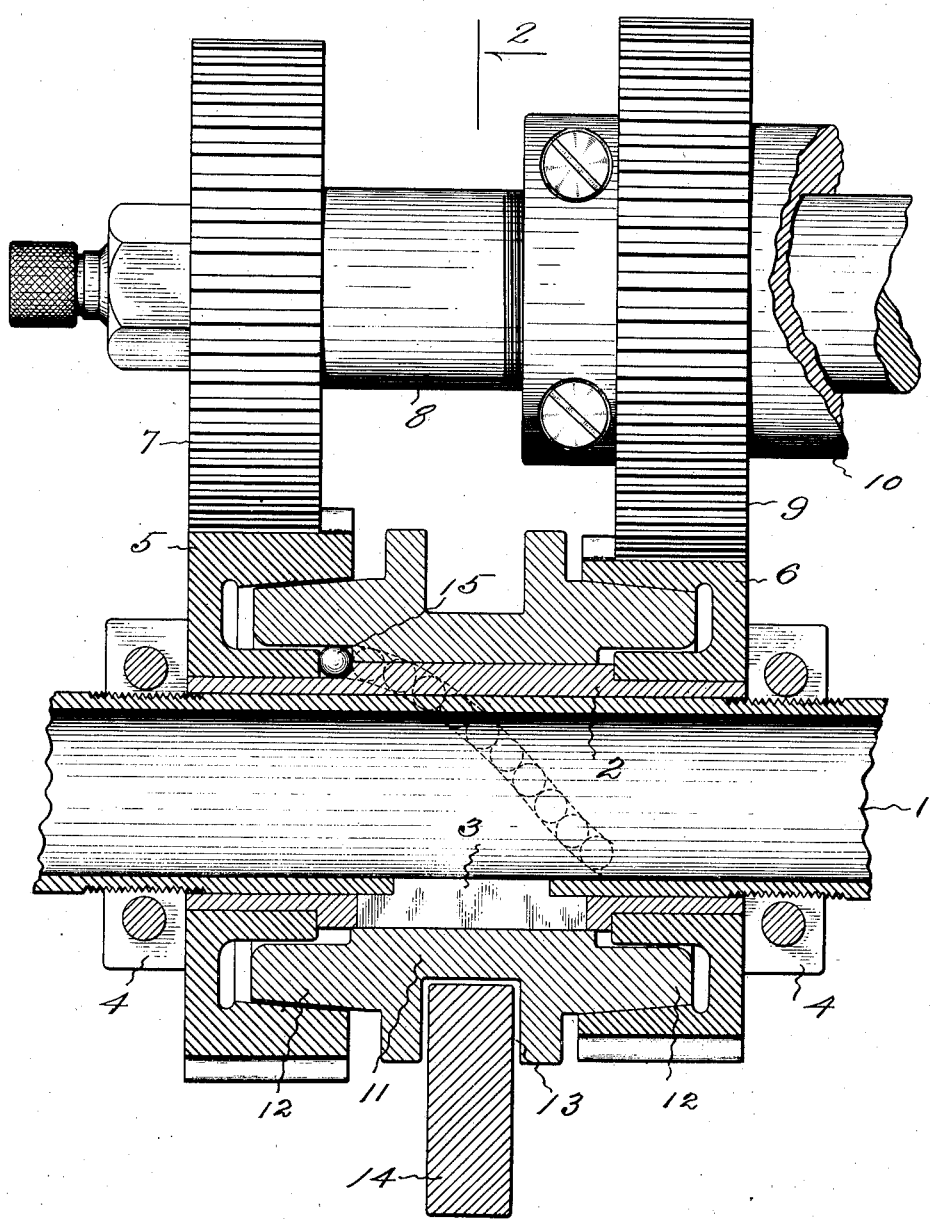

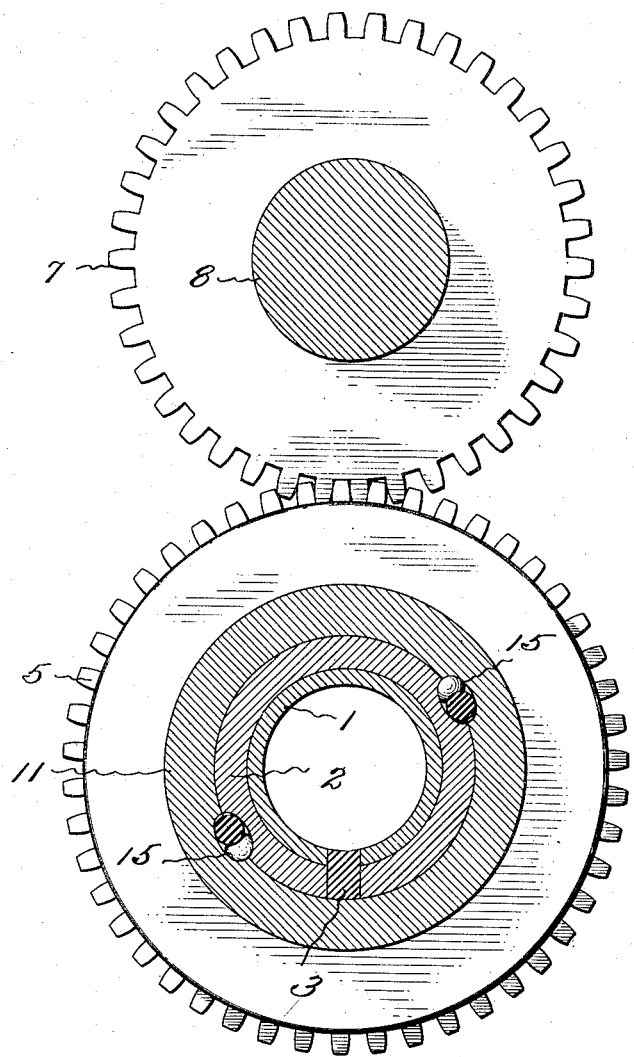

UNITED STATES PATENT OFFICE.

CHRISTOPHER M. SPENCER, OF WINDSOR, CONNECTICUT, ASSIGNOR TO THE UNIVERSAL MACHINE SCREW COMPANY, OF HARTFORD, CONNECTICUT, A CORPORATION OF CONNECTICUT.

CLUTCH.

No. 850,854.      Specification of Letters Patent.      Patented April 16, 1907.

Application filed March 8, 1906. Serial No. 304,838.

*To all whom it may concern:*

Be it known that I, CHRISTOPHER M. SPENCER, a citizen of the United States, residing at Windsor, in the county of Hartford and State of Connecticut, have invented a new and useful Clutch, of which the following is a specification.

This invention relates to that class of devices which are used for frictionally connecting a gear, pulley, drum, or wheel with a shaft, journal, spindle, or axle.

The object of the invention is to provide a device of this class which is simple and cheap to construct and assemble and which will clutch very strongly and release very easily without shock or noise.

The invention is usable in place of the common friction-clutch, although it is particularly designed for mechanism where a reverse motion is desired, and is especially applicable for use in an automatic screw-machine, in which the direction of rotation of high-speed spindles is frequently changed.

The form of the invention shown in the drawings is designed to connect a shaft with first one and then the other of gears which are rotated oppositely for the purpose of driving the shaft in opposite directions, and the sliding cones which connect the parts when moved travel spirally, so that the male and female parts of the clutch engage with a turn that forces them tightly together.

Figure 1 of the drawings shows a longitudinal section of a double clutch arranged for connecting a shaft with either of two gears. Fig. 2 shows a transverse section of the same on the plane indicated by the line 2 2 on Fig. 1.

On the driven shaft 1 is a sleeve 2. These are fastened together by the key 3, and the sleeve is held from longitudinal movement by the threaded collars 4. Loosely mounted on the sleeve between the collar at one end and a shoulder on the sleeve, so that it may rotate freely, but cannot move longitudinally of the shaft, is a gear 5. Loosely mounted on the other end of the sleeve between the collar at that end and a shoulder on the sleeve is a gear 6. This gear is free to rotate on the sleeve, but is held against movement longitudinally of the shaft. Meshing with the gear 5 is a gear 7 on a solid shaft 8, and meshing with the gear 6 is a gear 9 on a tubular shaft 10. The tubular shaft is adapted to be rotated in one direction and the solid shaft in the other direction, so that the gears 5 and 6 on the sleeve will be rotated in opposite directions.

On the sleeve which is keyed to the driven shaft is a longitudinally-movable collar 11, which has a cone 12 at each end. One cone is adapted to enter into and engage the walls of a conical recess in the gear at one end, and the other cone is adapted to enter into and engage the walls of the conical recess in the gear at the other end of the sleeve. When a cone engages a gear, the driven shaft is rotated in the same direction as the gear. In the exterior of the cone-collar is a groove 13 for the purpose of receiving the lever 14, which is employed to move the cone-collar lengthwise on the sleeve.

In the outer surface of the sleeve that is keyed to the driven shaft are one or more spiral grooves, and in the inner surface of the cone-collar are corresponding spiral grooves. In these grooves are balls 15. These balls key the collar and the sleeve together and at the same time impart to the collar or male clutch part a twist or rotary movement as it is moved back and forth. They also tend to force the collar lengthwise of the sleeve, according to the strain that is brought to bear on the collar by the gear with which it is engaged.

If it is designed to rotate the driven shaft in one direction, the cone-collar is moved by the lever to one side, so as to connect the proper gear with the sleeve that is keyed to the driven shaft. In order to rotate the driven shaft in the opposite direction, the cone-collar is moved the other way, so as to connect the other gear with the sleeve that is keyed to the driven shaft. The grooves are so designed that as the male clutch part enters the female clutch part, the balls cause the collar to move rotarily in the same direction as the gear is being driven. By reason of this the friction of the two surfaces as they come together tends to rotate the male clutch part, and this rotation of male clutch part causes it to be forced by the spiral balls more tightly into the female clutch part, and consequently to effect a more positive grip. As the result of the employment of the balls arranged in this manner a very powerful grip between the parts is obtained, and this grip is effected without shock or blow and without noise and with practically no slip. On the other hand, the use of the balls arranged in this way insures the easy separation of the parts when it is desired to stop the rotation of the driven shaft or to engage the other gear and rotate the driven shaft in the opposite direction.

As stated, the invention is applicable for clutching either gears, wheels, pulleys, or drums, and it may be arranged for connecting either one or two driven bodies to a shaft journal, spindle, or axle.

Without departing from the invention the clutch part on the collar could be the female part instead of the male part, in which case the male part would be upon the driving-body. One or any desired number of sets of balls may be used for the purpose of splining the collar to the sleeve, and of course, if desired, the spiral key which connects the sleeve with the cone-collar may be formed of something else besides balls.

The invention claimed is—

1. The combination of a shaft, a sleeve keyed to the shaft, a gear loosely mounted on each end of the sleeve, collars holding the sleeve in position on the shaft and the gears on the sleeve, a clutch-collar mounted on the sleeve between the gears and adapted to be moved longitudinally for connecting either of the gears with the sleeve, and balls arranged spirally between and keying together the sleeve and the clutch-collar, substantially as specified.

2. The combination of a shaft, a sleeve keyed to the shaft, a gear loosely mounted on the sleeve, a collar holding the sleeve in position on the shaft and the gear on the sleeve, a clutch-collar mounted on the sleeve adjacent to the gear and adapted to be moved longitudinally for connecting the gear with the sleeve and balls arranged spirally between and keying together the sleeve and the clutch-collar, substantially as specified.

3. The combination of a shaft, a sleeve keyed to the shaft, a gear loosely mounted on each end of the sleeve, collars holding the sleeve in position on the shaft and the gears on the sleeve, a clutch-collar mounted on the sleeve between the gears and adapted to be moved longitudinally for connecting either of the gears with the sleeve, a spiral key arranged between and keying together the sleeve and the clutch-collar, substantially as specified.

4. The combination of a shaft, a sleeve keyed to the shaft, a gear loosely mounted on the sleeve, a collar holding the sleeve in position on the shaft and the gear on the sleeve, a clutch-collar mounted on the sleeve adjacent to the gear and adapted to be moved longitudinally for connecting the gear with the sleeve, and a spiral key arranged between and keying together the sleeve and the clutch-collar, substantially as specified.

5. The combination of a shaft, two gears loosely mounted on the shaft, a clutch-collar mounted on the shaft between the gears and adapted to be moved longitudinally for connecting either of the gears with the shaft, and balls arranged spirally between and keying together the shaft and the clutch-collar, substantially as specified.

6. The combination of a driving-body, a driven body, a clutch-collar mounted on one body and adapted to be engaged with and disengaged from the other body, and balls occupying coinciding spiral grooves in and keying together the collar and the body upon which it is mounted, substantially as specified.

7. The combination of a shaft, a sleeve keyed to the shaft, a rotatable body loosely mounted on the sleeve, a collar movable longitudinally on the sleeve and adapted to be engaged with and disengaged from the rotatable body, and a loose spiral key occupying coinciding spiral grooves in and keying together the sleeve and the collar, substantially as specified.

CHRISTOPHER M. SPENCER.

Witnesses:
ETHEL M. LOWE,
HARRY R. WILLIAMS.